US010887634B2

(12) United States Patent
Lin et al.

(10) Patent No.: US 10,887,634 B2
(45) Date of Patent: Jan. 5, 2021

(54) VIDEO RESOURCE FILE ACQUISITION METHOD AND MANAGEMENT SYSTEM

(71) Applicant: WANGSU SCIENCE & TECHNOLOGY CO., LTD., Shanghai (CN)

(72) Inventors: Yiling Lin, Shanghai (CN); Xu Zeng, Shanghai (CN); Dongyi Chen, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/480,028

(22) PCT Filed: Aug. 21, 2018

(86) PCT No.: PCT/CN2018/101523
§ 371 (c)(1),
(2) Date: Jul. 23, 2019

(87) PCT Pub. No.: WO2020/019387
PCT Pub. Date: Jan. 30, 2020

(65) Prior Publication Data
US 2020/0037005 A1 Jan. 30, 2020

(30) Foreign Application Priority Data
Jul. 26, 2018 (CN) .......................... 2018 1 0837250

(51) Int. Cl.
*H04N 21/234* (2011.01)
*H04N 21/2347* (2011.01)
(Continued)

(52) U.S. Cl.
CPC ......... *H04N 21/2347* (2013.01); *G06F 21/10* (2013.01); *H04L 9/0822* (2013.01); *H04L 9/14* (2013.01); *H04N 21/234345* (2013.01)

(58) Field of Classification Search
None
See application file for complete search history.

(56) References Cited

U.S. PATENT DOCUMENTS 7,509,667 B1 * 3/2009 Cook ................. H04N 21/2347
725/87
9,277,295 B2 * 3/2016 Pinder ................. H04N 7/1675
(Continued)

FOREIGN PATENT DOCUMENTS

CN 103746798 A 4/2014
CN 104038468 A 9/2014
(Continued)

OTHER PUBLICATIONS

The China National Intelleectual Property Administration (CNIPA) The China Search Report for 201810837250.9 dated Aug. 9, 2019 3 Pages.
(Continued)

*Primary Examiner* — An Son P Huynh
(74) *Attorney, Agent, or Firm* — Anova Law Group, PLLC (57) ABSTRACT

A video resource file acquisition method includes: acquiring, by a terminal, a resource decryption key of a target video from a key management server; transmitting, by the terminal, a resource download request for the target video to a resource server of the target video; after receiving the resource download request for the target video, acquiring, by the resource server, a resource encryption key of the target video from the key management server; encrypting, by the resource server, a resource file of the target video by using the resource encryption key and feeding back, by the resource server, the encrypted resource file to the terminal;
(Continued)

and after receiving the encrypted resource file, decrypting, by the terminal, the encrypted resource file using the resource decryption key.

18 Claims, 2 Drawing Sheets

(51) Int. Cl.
*H04N 21/2343* (2011.01)
*G06F 21/10* (2013.01)
*H04L 9/14* (2006.01)
*H04L 9/08* (2006.01)

(56) References Cited

U.S. PATENT DOCUMENTS

| | | | |
|---|---|---|---|
| 9,819,582 B2* | 11/2017 | Ellis | H04L 45/64 |
| 9,872,086 B2* | 1/2018 | Kitazato | H04N 21/2353 |
| 9,973,481 B1* | 5/2018 | Sharifi Mehr | H04L 9/0825 |
| 10,455,276 B2* | 10/2019 | Guerra | H04N 21/64 |
| 2002/0059440 A1* | 5/2002 | Hudson | H04N 21/45452 709/231 |
| 2006/0085862 A1* | 4/2006 | Witt | H04N 21/6125 726/26 |
| 2007/0157281 A1* | 7/2007 | Ellis | H04N 7/17309 725/134 |
| 2007/0265968 A1* | 11/2007 | Kahn | G06Q 20/382 705/51 |
| 2008/0019516 A1* | 1/2008 | Fransdonk | H04N 7/1675 380/201 |
| 2008/0232598 A1* | 9/2008 | Vennelakanti | G06F 21/602 380/279 |
| 2009/0030841 A1 | 1/2009 | Sato et al. | |
| 2009/0262942 A1* | 10/2009 | Maeda | H04L 9/0855 380/278 |
| 2010/0017831 A1* | 1/2010 | Newell | H04N 7/1675 725/104 |
| 2010/0185852 A1* | 7/2010 | Ogawa | G06F 21/602 713/165 |
| 2011/0154383 A1* | 6/2011 | Hao | H04N 21/25816 725/8 |
| 2012/0246463 A1* | 9/2012 | Shea | H04L 63/0428 713/153 |
| 2013/0104163 A1* | 4/2013 | He | H04N 21/2347 725/31 |
| 2013/0136264 A1 | 5/2013 | Kim et al. | |
| 2014/0122866 A1* | 5/2014 | Haeger | H04L 63/061 713/153 |
| 2016/0162669 A1* | 6/2016 | Mikhailov | G06F 21/445 713/2 |
| 2016/0219319 A1* | 7/2016 | Servignat | H04N 21/422 |
| 2016/0269365 A1* | 9/2016 | Reddy | H04L 9/0822 |
| 2018/0048464 A1* | 2/2018 | Lim | H04L 9/0894 |
| 2018/0241561 A1* | 8/2018 | Albertson | H04L 9/0891 |
| 2019/0149527 A1* | 5/2019 | John | H04L 63/0853 713/171 |
| 2019/0370013 A1* | 12/2019 | Katchapalayam | G06F 21/575 |

FOREIGN PATENT DOCUMENTS

| | | |
|---|---|---|
| CN | 104284213 A | 1/2015 |
| CN | 106973310 A | 7/2017 |
| CN | 107659829 A | 2/2018 |

OTHER PUBLICATIONS

The World Intellectual Property Organization (WIPO) International Search Report and Written Opionion for PCT/CN2018/101523 dated Apr. 28, 2019 9 pages.

* cited by examiner

VIDEO RESOURCE FILE ACQUISITION METHOD AND MANAGEMENT SYSTEM

CROSS-REFERENCES TO RELATED APPLICATIONS

This application is a national phase entry under 35 U.S.C § 371 of International Application No. PCT/CN2018/101523 filed on Aug. 21, 2018, which claims priority of Chinese Patent Application No. 2018108372509, filed with the State Intellectual Property Office of P. R. China on Jul. 26, 2018, the entire contents of all of which are incorporated herein by reference.

FIELD OF DISCLOSURE

The present disclosure generally relates to the field of video encryption technology and, more particularly, relates to a video resource file acquisition method and management system.

BACKGROUND

With the increasing awareness of privacy protection and data security in the information era, more and more users are beginning to use encryption technologies to protect some important data. Among these technologies, video encryption is an encryption technology for video resources, which may effectively prevent data leakage in video resources.

In general, after a video provider encrypts a video resource file, a decryption key may be separately stored, and then an index file, that records a storage address of the video resource file and a storage address of the decryption key, may be generated. In this way, when a certain video needs to be played, a terminal may first acquire the storage address of the corresponding index file, and acquire the corresponding index file according to the storage address. The terminal may then acquire the encrypted resource file and the decryption key from the index file, use the decryption key to decrypt the encrypted resource file, and eventually play the video resource file that has been decrypted.

In the process of implementing the present disclosure, applicants have found that the existing technologies have at least the following problems:

In the process of acquiring an index file by a terminal, the index file may be easily intercepted by a third party. The third party may illegally crack a video resource file by using the intercepted index file, and thus the security of video resources is poor.

BRIEF SUMMARY OF THE DISCLOSURE

To solve the problems in the existing technologies, the embodiments of the present disclosure provide a video resource file acquisition method and management system. The technical solutions are as follows:

In one aspect, a method for acquiring a video resource file is provided. The method includes:

acquiring, by a terminal, a resource decryption key of a target video from a key management server;

transmitting, by the terminal, a resource download request for the target video to a resource server of the target video;

after receiving the resource download request for the target video, acquiring, by the resource server, a resource encryption key of the target video from the key management server;

encrypting, by the resource server, a resource file of the target video by using the resource encryption key and feeding back, by the resource server, the encrypted resource file to the terminal; and after receiving the encrypted resource file, decrypting, by the terminal, the encrypted resource file using the resource decryption key.

Optionally, acquiring, by the terminal, the resource decryption key of the target video from the key management server includes:

transmitting, by the terminal, a key information acquisition request of the target video to the key management server, where the key information acquisition request includes a device identifier of the terminal, request transmission time, and identification information of the target video;

determining, by the key management server, the resource decryption key of the target video based on the identification information of the target video, and encrypting, by the key management server, the resource decryption key to generate key information of the target video by using the device identifier and the request transmission time;

feeding back, by the key management server, the key information of the target video to the terminal by means of encrypted transmission; and receiving and decrypting, by the terminal, the key information to obtain the resource decryption key of the target video.

Optionally, after transmitting, by the terminal, the resource download request for the target video to the resource server of the target video, the method further includes:

receiving, by a CDN cluster, the resource download request for the target video and determining, by the CDN cluster, whether the resource file of the target video has already been stored; and if the resource file of the target video has already been stored, feeding back, by the CDN cluster, the stored resource file of the target video to the terminal, and if the resource file of the target video has not been stored yet, transmitting, by the CDN cluster, the resource download request for the target video to the resource server of the target video.

Optionally, after feeding back, by the resource server, the encrypted resource file to the terminal, the method further includes:

receiving and storing, by the CDN cluster, the encrypted resource file, and transmitting, by the CDN cluster, the encrypted resource file to the terminal.

Optionally, after determining, by the key management server, the resource decryption key of the target video, the method further includes:

if a currently determined resource decryption key of the target video is different from a last determined resource decryption key of the target video, transmitting, by the key management server, a key update message to the terminal; and transmitting, by the terminal, the resource download request for the target video to the resource server of the target video further includes:

adding, by the terminal, a key update sign to a generated resource download request for the target video.

Optionally, receiving, by the CDN cluster, the resource download request for the target video and determining, by the CDN cluster, whether the resource file of the target video has already been stored includes:

receiving, by the CDN cluster, the resource download request for the target video, if the resource download request includes the key update sign, transmitting, by the CDN cluster, the resource download request for the target video to the resource server of the target video, and if the resource download request does not include the key update sign, checking, by the CDN cluster, whether the resource file of the target video has already been stored.

Optionally, a play instruction of the target video and the resource download request for the target video both include a data range identifier of the target video; and encrypting, by the resource server, the resource file of the target video by using the resource encryption key includes:

encrypting, by the resource server, a resource file corresponding to the data range identifier of the target video by using the resource encryption key.

According to the foregoing methods, the terminal acquires the resource decryption key from the key management server and requests the resource file from the resource server. The resource server acquires the resource encryption key from the key management server, encrypts the resource file by using the resource encryption key, and transmits the encrypted resource file to the terminal. Finally, the terminal decrypts the resource file by using the acquired resource decryption key. In the processes of transmitting the resource file in the external network, the resource file is always in an encrypted state, and the resource file and the resource decryption key respectively reach the terminal through different interaction processes. The probability of the resource file and the resource decryption key being intercepted simultaneously is low, thereby improving the security of video resources to some degree.

Further, when the key management server transmits the resource decryption key to the terminal, the resource decryption key may be further encrypted based on the terminal identifier and the time, and transmitted by using encrypted transmission. In this way, the probability of the resource decryption key being cracked is low, and the security of video resources is improved.

In another aspect, a video resource file management system is provided. The system includes a terminal, a resource server, and a key management server, where the terminal, the resource server, and the key management server together implement the methods described in the foregoing embodiments.

Optionally, the system further includes the CDN cluster described in the foregoing embodiments.

Optionally, the terminal performs data transmission with the key management server by using a preset decryption module, and the resource server performs data transmission with the key management server by using a preset encryption module.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the present disclosure will be made in detail hereinafter with reference to the accompanying drawings.

The embodiments of the present disclosure provide a method for acquiring a video resource file. The method may be implemented by a combination of a resource server, a terminal, and a key management server, where the resource server may be a server that stores resource files of a large number of videos and provides video download functionality to the terminal. The resource server may be a physical server or a cloud server. A client-side program corresponding to the resource server may be installed on the terminal, and a user may directly access the resource server through a browser on the terminal.

The terminal may include a mobile phone, a tablet computer, a personal computer, a smart TV, a digital set-top box, etc. A user may acquire a resource file stored by the resource server through the above-mentioned client-side program installed on the terminal.

The key management server may be a server for generating and storing keys corresponding to a video resource file. The keys may be divided into a resource encryption key for encrypting the video resource file and a resource decryption key for decrypting the encrypted video resource file. Apparently, the resource encryption key and the resource decryption key are identical. The key management server may establish a communication connection with the resource server, and support access from the terminal.

The foregoing resource server, the terminal, and the key management server may each include a processor, a memory, and a transceiver. The processor may be configured to perform processing of video play in the following process. The memory may be configured to store the data required and generated in the following process. The transceiver may be configured to receive and transmit related data in the following process.

Figure 1:
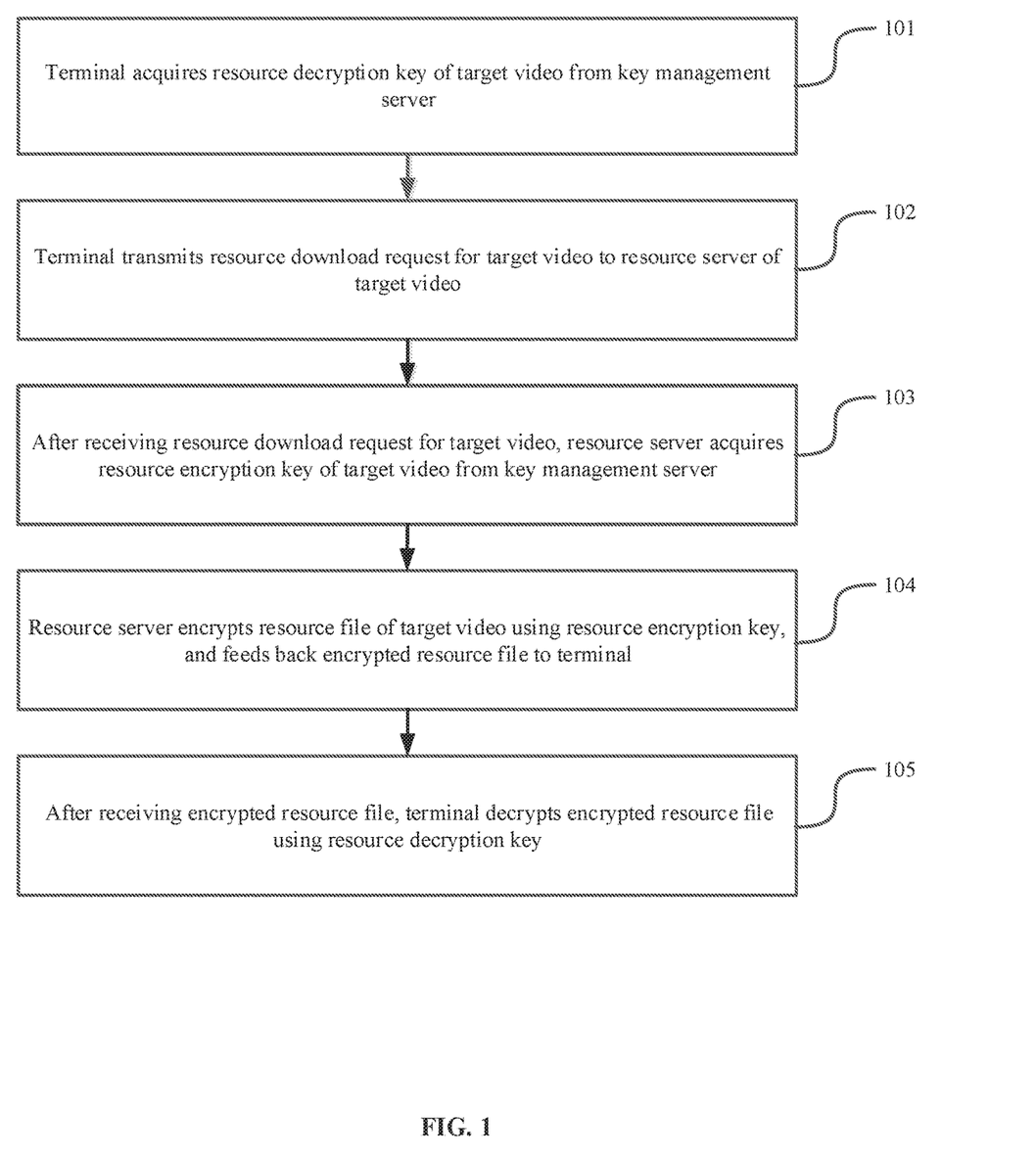
FIG. 1 is a flowchart of a method for acquiring a video resource file according to some embodiments of the present disclosure.

The processing flow shown in FIG. 1 will be made in detail hereinafter with reference to specific implementations, and the content may be as follows:

Step 101: The terminal acquires a resource decryption key of a target video from the key management server.

In a specific implementation, when a user wants to use a terminal to play a certain video, the user may open a video play application installed on the terminal (i.e., the foregoing client-side program) and search for a playing page of the video. When the user clicks a play button for the video, the terminal may receive the corresponding play instruction. Taking a target video as an example, after receiving the play instruction of the target video, the terminal may retrieve a pre-cached access address of the key management server, and then acquire, based on the access address, the resource decryption key, used for decrypting the encrypted resource file of the target video, from the key management server.

Optionally, the resource decryption key is generated by the key management server, encrypted and then transmitted to the terminal. Correspondingly, the process of acquiring the resource decryption key by the terminal may be specifically as follows:

The terminal transmits a key information acquisition request of the target video to the key management server.

The key information acquisition request includes a device identifier of the terminal, the request transmission time, and identification information of the target video. The device identifier may be the MAC address of the terminal or the token information directly acquired from the key management server, which may uniquely identify the terminal. The identification information of the target video may be used to uniquely determine the target video.

The key management server determines the resource decryption key of the target video based on the identification information of the target video, and encrypts the resource decryption key to generate key information of the target video based on the device identifier and the request transmission time. Further, the key management server may feed back the key information of the target video to the terminal by means of encrypted transmission.

The terminal receives the key information and decrypts the key information to get the resource decryption key of the target video.

In one implementation, after receiving a play instruction of the target video, the terminal may transmit a key information acquisition request of the target video to the key management server. The key information acquisition request includes the device identifier of the terminal, the request transmission time of the current key information acquisition request, and the identification information of the target video. Upon receiving the key information acquisition request of the target video, the key management server may first determine the resource decryption key of the target video based on the identification information of the target video. Here, the resource decryption key may be generated in advance and stored locally by the key management server, or may be generated ad hoc by the key management server after receiving the key information acquisition request. The rule for resource decryption key generation needs to meet a certain security level. For example, the length of a resource decryption key needs to be at least eight bits, be composed of numbers, uppercase, and lowercase letters, etc. In the meantime, in order to ensure that resource decryption keys of different videos are different from each other, the identification information of a target video may be inserted into the resource decryption key of the target video when the resource decryption key is generated.

Next, the key management server may encrypt the resource decryption key to generate the key information of the target video by using the device identifier of the terminal and the request transmission time. Specifically, the mode of the key information=BASE64 (terminal token+resource decryption key+MD5 (the request transmission time)) may be adopted for encoding. In this way, when different terminals request a same video resource or the same terminal requests a same video resource at different moments, the generated key information is totally different, thereby effectively reducing the possibility of a resource decryption key to be cracked.

Afterwards, the key management server may feed back the key information of the target video to the terminal by means of encrypted transmission. Here, the means of encrypted transmission may include the use of existing asymmetric encryption transmission methods (e.g., an RSA encryption algorithm), which the disclosed implementation does not specifically limit.

After receiving the key information, the terminal may perform reverse parsing on the key information to get the resource decryption key of the target video.

Step 102: The terminal transmits a resource download request for the target video to the resource server of the target video.

In one implementation, after receiving the play instruction of the target video, the terminal may also determine the access address of the resource server of the target video, and transmit, based on the access address, a resource download request for the target video to the resource server of the target video. It should be noted that, in general situations, there is not necessarily a sequential order in processing the resource download request transmission in Step 102 and processing the resource decryption key acquisition in Step 101.

Optionally, the resource server may also enable a CDN acceleration service. Correspondingly, after the terminal transmits the resource download request to the resource server, the following process may be performed: a CDN cluster receives the resource download request for the target video, and queries whether the encrypted resource file of the target video has already been stored; if the encrypted resource file has already been stored, the CDN cluster feeds back the stored encrypted resource file of the target video to the terminal; and if the encrypted resource file has not been stored yet, the CDN cluster transmits the resource download request for the target video to the resource server of the target video.

In one implementation, the resource server of the target video may enable the CDN acceleration service, so that a user may acquire the resource file of the target video through the CDN cluster more quickly. Specifically, after the terminal transmits the resource download request to the resource server, the CDN cluster may receive the resource download request for the target video transmitted by the terminal, and then query whether the encrypted resource file of the target video has already been stored in the cluster. If the encrypted resource file of the target video has already been stored in the cluster, the CDN cluster may feed back the stored encrypted resource file of the target video to the terminal. If the encrypted resource file of the target video has not been stored in the cluster, the CDN cluster may transmit the resource download request for the target video to the resource server of the target video.

Step 103: After receiving the resource download request for the target video, the resource server acquires a resource encryption key of the target video from the key management server.

In one implementation, after the terminal transmits the resource download request for the target video to the resource server, if the resource server receives the corresponding resource download request, the resource server may acquire the resource encryption key, for encrypting the resource file of the target video, from the key management server. Apparently, prior to acquiring the resource encryption key, the resource server may verify the play authorization of the terminal. If the target terminal has the authorization to play the target video, the resource server may perform the subsequent process. If the target terminal does not have the authorization to play the target video, the resource server may feed back a notification of video play failure to the terminal.

The process of acquiring a resource encryption key by the resource server may refer to the foregoing process of acquiring a resource decryption key by the terminal. In the acquisition process, since the networking between the resource server and the key management server is completely controllable, the key management server does not need to further encrypt the generated resource encryption key, and may transmit the resource encryption key directly to the resource server by means of HTTPS. Apparently, the transmission of the resource encryption key may be also encrypted by using an encryption method similar to that described in Step 101, which the disclosed implementation does not intend to limit.

Step 104: The resource server encrypts the resource file of the target video using the resource encryption key, and feeds back the encrypted resource file to the terminal.

In one implementation, after acquiring the resource encryption key of the target video, the resource server may retrieve the locally stored resource file of the target video, and then encrypt the retrieved resource file using the resource encryption key by using a preset resource encryption algorithm. Next, the resource server may feed back the encrypted resource file to the terminal based on a TCP transmission protocol.

Optionally, the terminal may request only a portion of the resource file of the target video. Correspondingly, the play instruction of the target video and the resource download request for the target video both include a data range identifier of the target video, and the process of Step 104 may be as follows: the resource server encrypts a resource file corresponding to the data range identifier of the target video by using a resource encryption key.

In one implementation, when a user controls the terminal to play the target video, the user may also specify a portion of the video content to be played, for example, the content between 0:10:00 and 0:20:00 needs to be played. In this case, the play instruction of the target video received by the terminal may include a corresponding data range identifier of the target video. Afterwards, when the terminal transmits the resource download request for the target video to the resource server, the terminal may also add this data range identifier to the resource download request. Further, when the resource server encrypts the resource file of the target video using the resource encryption key, the resource server may also encrypt only the portion of the resource file corresponding to the data range identifier.

Optionally, in the case where the resource server has enabled the CDN acceleration service as described above, the following process may be included in Step 104: the CDN cluster receives and stores the encrypted resource file, and transmits the encrypted resource file to the terminal.

In one implementation, when the resource server feeds back the encrypted resource file to the terminal, if the resource server has enabled the CDN acceleration service, the CDN cluster may receive the encrypted resource file. In that case, the CDN cluster may store the encrypted resource file first, which is convenient for responding to subsequent acquisition requests for the resource file of the target video from other terminals. In the meantime, the CDN cluster may transmit the encrypted resource file to the terminal. It is to be understood that the resource file stored in the CDN cluster is encrypted using the resource encryption key, and different terminals may all obtain a same resource decryption key from the key management server. Therefore, upon acquiring the encrypted resource file from the CDN cluster, any terminal may decrypt and play the encrypted resource file using the resource decryption key obtained from the key management server.

Step 105: After receiving the encrypted resource file, the terminal decrypts the encrypted resource file using the resource decryption key.

In one implementation, after receiving the encrypted resource file of the target video, the terminal may decrypt the encrypted resource file according to a preset resource decryption algorithm (which corresponds to the preset resource encryption algorithm in Step 104) by using the resource decryption key acquired in Step 101, and decode the decrypted resource file to get the resource file of the target video, thereby accomplishing the play or download of the target video.

Optionally, in the case where the resource server has enabled the CDN acceleration service, after the key management server determines the resource decryption key of the target video, the following process is further included: if the currently determined resource decryption key of the target video is different from the last determined resource decryption key of the target video, the key management server transmits a key update message to the terminal. Further, before transmitting the resource download request, the terminal may also add a key update sign to the generated resource download request for the target video.

In one implementation, if the resource server has enabled the CDN acceleration service, after determining the resource decryption key of the target video, the key management server needs to determine whether the resource decryption key of the target video has been updated. Specifically, the key management server may determine whether the currently determined resource decryption key of the target video is the same as the last determined resource decryption key of the target video. Here, the "last determined" refers to the process of last determination of the resource decryption key of the target video by the key management server responsive to receiving a key information acquisition request of the target video transmitted by a random terminal. If the two keys are the same, the resource decryption key of the target video has not changed during the time interval between the two determination processes, which means that the resource encryption key of the target video has not changed either. The key management server may then perform the subsequent process as described above. If the two keys are different, it means that the resource decryption key and the resource encryption key of the target video have been updated during the time interval between the two determination processes. The key management server may then transmit a key update message to the terminal, to inform the terminal that the resource encryption/decryption keys of the target video have been updated. Further, recognizing that the resource encryption/decryption keys of the target video have been updated, the terminal may add a key update sign to the resource download request before transmitting the resource download request for the target video. It should be noted that, if the key management server has not previously determined the resource decryption key of the target video, the subsequent process may be performed according to the case where the resource encryption key has not changed.

Optionally, the CDN cluster receives the resource download request for the target video. If the resource download request includes a key update sign, the CDN cluster transmits the resource download request for the target video to the resource server of the target video. If the resource download request does not include the key update sign, the CDN cluster determines whether the encrypted resource file of the target video has already been stored.

In one implementation, after receiving the resource download request for the target video, the CDN cluster may determine whether the resource download request includes a key update sign. If the resource download request includes a key update sign, the CDN cluster may transmit the resource download request for the target video to the resource server of the target video. If the resource download request does not include a key update sign, the CDN cluster may determine whether the encrypted resource file of the target video has already been stored. It is to be understood that, after the resource encryption/decryption keys of the target video have been updated, the encrypted resource file of the target video cached in the CDN cluster is encrypted based on the resource encryption key before the update. If the terminal acquires the encrypted resource file cached in the CDN cluster, the acquired resource file will be unable to be decrypted successfully by using the updated resource decryption key. Therefore, the CDN cluster needs to re-acquire the resource file of the target video encrypted based on the latest resource encryption key from the resource server of the target video, and override the already stored resource file of the target video.

Figure 2:
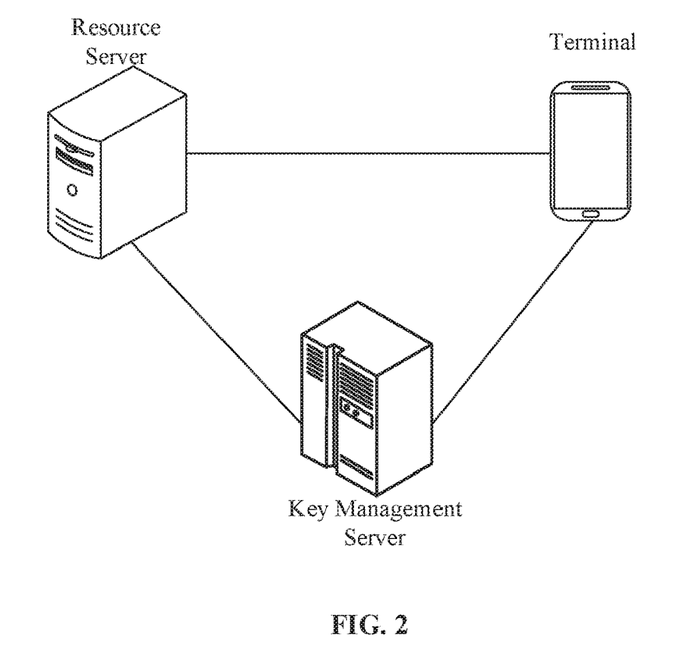
FIG. 2 is a frame diagram of a video resource file management system according to some embodiments of the present disclosure.

Based on the similar technical concept, the embodiments of the present disclosure further provide a video resource file management system. As shown in FIG. 2, the system includes a terminal, a resource server, and a key management server. The terminal, the resource server, and the key management server together implement the methods described in the foregoing embodiments.

Figure 3:
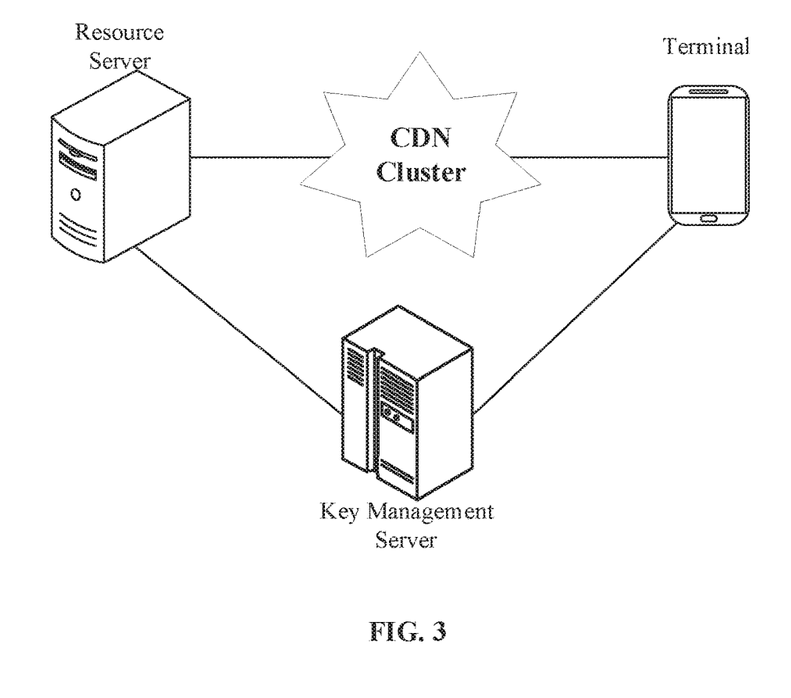
FIG. 3 is a frame diagram of another video resource file management system according to some embodiments of the present disclosure.

Optionally, as shown in FIG. 3, the system further includes the CDN cluster as described in the foregoing embodiments.

Optionally, the terminal performs data transmission with the key management server by using a preset decryption module, and the resource server performs data transmission with the key management server by using a preset encryption module.

A person skilled in the art may understand that all or part of the steps of the above embodiments may take the form of hardware implementation or the form of implementation of programs for instructing relevant hardware. The programs may be stored in a computer-readable storage medium. The storage medium may be a read-only memory, a magnetic disk, or an optical disk, etc.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for acquiring a video resource file, comprising:
   acquiring, by a terminal, a resource decryption key of a target video from a key management server;
   transmitting, by the terminal, a resource download request of the target video to a resource server of the target video;
   after receiving the resource download request of the target video, acquiring, by the resource server, a resource encryption key of the target video from the key management server;
   encrypting, by the resource server, a resource file of the target video by using the resource encryption key and feeding back, by the resource server, the encrypted resource file to the terminal; and
   after receiving the encrypted resource file, decrypting, by the terminal, the encrypted resource file using the resource decryption key;
   wherein acquiring, by the terminal, the resource decryption key of the target video from the key management server includes:
   transmitting, by the terminal, a key information acquisition request of the target video to the key management server, wherein the key information acquisition request includes a device identifier of the terminal, request transmission time, and identification information of the target video,
   determining, by the key management server, the resource decryption key of the target video based on the identification information of the target video, and encrypting, by the key management server, the resource decryption key to generate key information of the target video by using the device identifier and the request transmission time,
   feeding back, by the key management server, the key information of the target video to the terminal, and
   receiving and decrypting, by the terminal, the key information to obtain the resource decryption key of the target video.

2. The method according to claim 1, wherein:
   feeding back, by the key management server, the key information of the target video to the terminal is performed by means of encrypted transmission.

3. The method according to claim 2, after transmitting, by the terminal, the resource download request of the target video to the resource server of the target video, the method further includes:
   receiving, by a CDN cluster, the resource download request of the target video and determining, by the CDN cluster, whether the encrypted resource file of the target video has already been stored; and
   in response to the encrypted resource file of the target video has having already been stored, feeding back, by the CDN cluster, the stored encrypted resource file of the target video to the terminal, and in response to the encrypted resource file of the target video having not been stored yet, transmitting, by the CDN cluster, the resource download request of the target video to the resource server of the target video.

4. The method according to claim 3, after feeding back, by the resource server, the encrypted resource file to the terminal, the method further includes:
   receiving and storing, by the CDN cluster, the encrypted resource file, and transmitting, by the CDN cluster, the encrypted resource file to the terminal.

5. The method according to claim 3, after determining, by the key management server, the resource decryption key of the target video, the method further includes:
   in response to a currently determined resource decryption key of the target video being different from a last determined resource decryption key of the target video, transmitting, by the key management server, a key update message to the terminal; and
   wherein transmitting, by the terminal, the resource download request of the target video to the resource server of the target video further includes:
   adding, by the terminal, a key update sign to a generated resource download request of the target video.

6. The method according to claim 5, wherein receiving, by the CDN cluster, the resource download request of the target video and determining, by the CDN cluster, whether the encrypted resource file of the target video has already been stored further includes:
   receiving, by the CDN cluster, the resource download request of the target video, in response to the resource download request including the key update sign, transmitting, by the CDN cluster, the resource download request of the target video to the resource server of the target video, and in response to the resource download request not including the key update sign, checking, by the CDN cluster, whether the encrypted resource file of the target video has already been stored.

7. The method according to claim 1, wherein a play instruction of the target video and the resource download request of the target video both include a data range identifier of the target video; and wherein encrypting, by the resource server, the resource file of the target video by using the resource encryption key further includes:
encrypting, by the resource server, a resource file corresponding to the data range identifier of the target video by using the resource encryption key.

8. The method according to claim 1, after transmitting, by the terminal, the resource download request of the target video to the resource server of the target video, the method further includes:
receiving, by a CDN cluster, the resource download request of the target video and determining, by the CDN cluster, whether the encrypted resource file of the target video has already been stored; and
in response to the encrypted resource file of the target video having already been stored, feeding back, by the CDN cluster, the stored encrypted resource file of the target video to the terminal, and in response to the encrypted resource file of the target video having not been stored yet, transmitting, by the CDN cluster, the resource download request of the target video to the resource server of the target video.

9. The method according to claim 1, wherein the resource decryption key of the target video includes identification information of the target video.

10. A video resource file management system, comprising a terminal, a resource server, and a key management server, wherein the terminal, the resource server, and the key management server together implement a method for acquiring a video resource file, and the method includes:
acquiring, by the terminal, a resource decryption key of a target video from the key management server;
transmitting, by the terminal, a resource download request of the target video to the resource server for the target video;
after receiving the resource download request of the target video, acquiring, by the resource server, a resource encryption key of the target video from the key management server;
encrypting, by the resource server, a resource file of the target video by using the resource encryption key and feeding back, by the resource server, the encrypted resource file to the terminal; and
after receiving the encrypted resource file, decrypting, by the terminal, the encrypted resource file using the resource decryption key,
wherein acquiring, by the terminal, the resource decryption key of the target video from the key management server includes:
transmitting, by the terminal, a key information acquisition request of the target video to the key management server, wherein the key information acquisition request includes a device identifier of the terminal, request transmission time, and identification information of the target video,
determining, by the key management server, the resource decryption key of the target video based on the identification information of the target video, and encrypting, by the key management server, the resource decryption key to generate key information of the target video by using the device identifier and the request transmission time,
feeding back, by the key management server, the key information of the target video to the terminal, and
receiving and decrypting, by the terminal, the key information to obtain the resource decryption key of the target video.

11. The system according to claim 10, further comprising a CDN cluster, and the method for acquiring a video resource file further includes:
receiving, by the CDN cluster, the resource download request of the target video and determining, by the CDN cluster, whether the encrypted resource file of the target video has already been stored; and
in response to the encrypted resource file of the target video has having already been stored, feeding back, by the CDN cluster, the stored encrypted resource file of the target video to the terminal, and in response to the encrypted resource file of the target video has having not been stored yet, transmitting, by the CDN cluster, the resource download request of the target video to the resource server of the target video.

12. The system according to claim 11, after feeding back, by the resource server, the encrypted resource file to the terminal, the method further includes:
receiving and storing, by the CDN cluster, the encrypted resource file, and transmitting, by the CDN cluster, the encrypted resource file to the terminal.

13. The system according to claim 11, after determining, by the key management server, the resource decryption key of the target video, the method further includes:
in response to a currently determined resource decryption key of the target video being different from a last determined resource decryption key of the target video, transmitting, by the key management server, a key update message to the terminal; and
wherein transmitting, by the terminal, the resource download request of the target video to the resource server of the target video further includes:
adding, by the terminal, a key update sign to a generated resource download request of the target video.

14. The system according to claim 13, wherein receiving, by the CDN cluster, the resource download request of the target video and determining, by the CDN cluster, whether the encrypted resource file of the target video has already been stored further includes:
receiving, by the CDN cluster, the resource download request of the target video, in response to the resource download request including the key update sign, transmitting, by the CDN cluster, the resource download request of the target video to the resource server of the target video, and in response to the resource download request not including the key update sign, checking, by the CDN cluster, whether the encrypted resource file of the target video has already been stored.

15. The system according to claim 10, wherein the terminal performs data transmission with the key management server by using a preset decryption module, and the resource server performs data transmission with the key management server by using a preset encryption module.

16. The system according to claim 10, wherein:
feeding back, by the key management server, the key information of the target video to the terminal is performed by means of encrypted transmission.

17. The system according to claim 16, after transmitting, by the terminal, the resource download request of the target video to the resource server of the target video, the method further includes:
- receiving, by a CDN cluster, the resource download request of the target video and determining, by the CDN cluster, whether the encrypted resource file of the target video has already been stored; and
- in response to the encrypted resource file of the target video has already been stored, feeding back, by the CDN cluster, the stored encrypted resource file of the target video to the terminal, and in response to the encrypted resource file of the target video has not been stored yet, transmitting, by the CDN cluster, the resource download request of the target video to the resource server of the target video.

18. The system according to claim 10, wherein a play instruction of the target video and the resource download request of the target video both include a data range identifier of the target video; and
- wherein encrypting, by the resource server, the resource file of the target video by using the resource encryption key further includes:
  - encrypting, by the resource server, a resource file corresponding to the data range identifier of the target video by using the resource encryption key.

* * * * *